US010112202B1

(12) United States Patent
Dichter et al.

(10) Patent No.: US 10,112,202 B1
(45) Date of Patent: Oct. 30, 2018

(54) CYCLONIC AIR-COOLED MICROGRAVITY MILL

(71) Applicant: Aurora Flight Sciences Corporation, Manassas, VA (US)

(72) Inventors: Daniel W. Dichter, Manassas, VA (US); Riley Griffin, Manassas, VA (US); Roshan Kalghatgi, Manassas, VA (US); Scott McNee, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 0 days.

(21) Appl. No.: 15/648,222

(22) Filed: Jul. 12, 2017

(51) Int. Cl.
*B04C 3/06* (2006.01)
*B23Q 11/00* (2006.01)
(Continued)

(52) U.S. Cl.
CPC .................. *B04C 3/06* (2013.01); *B04C 9/00* (2013.01); *B23C 3/00* (2013.01); *B23Q 11/005* (2013.01);
(Continued)

(58) Field of Classification Search
CPC .............. B23Q 11/0042; B23Q 11/005; B23Q 11/0046; B23Q 11/006; B23Q 11/0891; B23Q 11/08; B23Q 11/14; B23Q 11/141; B23Q 11/145; B23Q 11/148; B23Q 17/007; B23Q 17/099; B23Q 17/20; B64G 4/00; B04C 3/06; B04C 2003/003; Y10T 409/30392
See application file for complete search history.

(56) References Cited

U.S. PATENT DOCUMENTS 2,221,127 A  *  11/1940  Bates ..................... B23F 23/12
                                                            165/206
3,534,926 A     10/1970  Wuenscher
                        (Continued)

FOREIGN PATENT DOCUMENTS

DE       19651662 A1 *  6/1998  ............. B08B 15/02
DE       10132387 A1 *  1/2003  ............... A23C 3/00
DE    102014111238 A1 *  5/2015  ......... B23Q 11/0046

OTHER PUBLICATIONS

"Machining in Microgravity", Graylan Vincent, undergraduate research paper, University of Washington, 2003.
(Continued)

*Primary Examiner* — Daniel Howell
*Assistant Examiner* — Yasir Diab
(74) *Attorney, Agent, or Firm* — Michael Stanley Tomsa; McAndrews, Held & Malloy, Ltd.; Eugene H. Nahm

(57) ABSTRACT

Disclosed herein is a cyclonic system for performing subtractive machining in microgravity systems. The cyclonic system comprises: an enclosure, a blower, and a debris collection module to collect the debris from the milling machine. The enclosure includes a top plate, a base plate, and a tapered side wall joining the top plate to the base plate. The enclosure defines a chamber to house a milling machine having a cutter tool. The blower generates an airstream that induces a cyclonic airflow to achieve cyclonic separation of debris within the enclosure. In operation, the cyclonic airflow urges the debris from the milling machine toward the base plate and into the milling machine.

21 Claims, 6 Drawing Sheets

(51) Int. Cl.
*B04C 9/00* (2006.01)
*B64G 4/00* (2006.01)
*B23C 3/00* (2006.01)
*B23Q 11/08* (2006.01)
*B04C 3/00* (2006.01)
*B23Q 11/10* (2006.01)
*B23Q 11/14* (2006.01)
*B23Q 17/00* (2006.01)
*B23Q 17/09* (2006.01)
*B23Q 17/20* (2006.01)

(52) U.S. Cl.
CPC ............ *B23Q 11/0891* (2013.01); *B64G 4/00* (2013.01); *B04C 2003/003* (2013.01); *B23C 2230/08* (2013.01); *B23C 2270/20* (2013.01); *B23Q 11/006* (2013.01); *B23Q 11/10* (2013.01); *B23Q 11/145* (2013.01); *B23Q 11/148* (2013.01); *B23Q 17/007* (2013.01); *B23Q 17/099* (2013.01); *B23Q 17/20* (2013.01); *Y10T 409/30392* (2015.01)

(56) References Cited

U.S. PATENT DOCUMENTS

| | | | | |
|---|---|---|---|---|
| 3,605,551 A * | 9/1971 | Steward | .................. | B23P 25/00 184/6 |
| 3,971,114 A * | 7/1976 | Dudley | .................. | B23B 27/10 407/120 |
| 4,986,703 A * | 1/1991 | Hampl | ................. | B23Q 11/006 144/252.1 |
| 5,245,152 A * | 9/1993 | McCall | .................... | B23H 1/08 219/69.14 |
| 5,263,800 A * | 11/1993 | Chen | .................... | B23Q 11/005 29/DIG. 101 |
| 5,332,341 A * | 7/1994 | Arai | ........................ | B23Q 3/002 408/61 |
| 5,544,986 A * | 8/1996 | Kudo | ..................... | B23B 49/04 408/61 |
| 5,779,402 A * | 7/1998 | Kameda | ............... | B23Q 11/006 408/56 |
| 5,901,623 A | 5/1999 | Hong | | |
| 6,036,412 A * | 3/2000 | Dalla | ................. | B23Q 11/0046 408/56 |
| 6,164,881 A * | 12/2000 | Shono | .................... | B23Q 1/621 408/56 |
| 6,210,086 B1 * | 4/2001 | Lecornet | ............ | B23Q 11/0042 408/67 |
| 6,325,806 B1 | 12/2001 | Fox | | |
| 6,675,549 B1 * | 1/2004 | Kaneda | .................. | B23Q 11/10 409/135 |
| 2004/0031364 A1 * | 2/2004 | Sato | .................... | B23Q 11/0858 83/98 |
| 2005/0286983 A1 * | 12/2005 | Janson | .................... | B23B 47/34 408/67 |
| 2016/0082478 A1 | 3/2016 | Walton et al. | | |

OTHER PUBLICATIONS

"NASA's EBF3: The Future of Art-to-Part Manufacturing", NASA whitepaper, 2009.

* cited by examiner

CYCLONIC AIR-COOLED MICROGRAVITY MILL

TECHNICAL FIELD

This present disclosure generally relates to manufacturing, more specifically to a system, method, and apparatus for performing subtractive machining in microgravity systems.

BACKGROUND

The trend of humanity to progressively spend more time in space has spurred governmental and private interest in the concept of in-space manufacturing. The cost of exiting and entering Earth's atmosphere provides a clear economic incentive to manufacture parts in-orbit and/or outside of Earth's environment. For example, to repair space stations, satellites, space capsules, etc. Current capabilities, however, are highly limited. Onboard the International Space Station, for example, the National Aeronautics and Space Administration (NASA) operates two fused deposition modeling (FDM) three dimensional (3D) printers capable of printing plastic parts in the International Space Station's microgravity environment. FDM 3D printing, as well as most additive manufacturing processes, suffers from drawbacks. For example, some 3D printing techniques require a liquid or a powder substrate, which are poorly suited for microgravity. Other FDM 3D printing techniques are limited to low strength plastics. Finally, most additive manufacturing processes require an additional subtractive machining (finishing) process to achieve tolerances that are suitable for higher-precision spaceflight-certified hardware.

NASA has been actively developing a metal 3D printing technology called Electron-Beam Freeform Fabrication (EBF3), which builds slightly oversized (i.e., near-net) metal parts by continuously fusing a metal feed spool using an electron beam. By design, the technology is ideal for microgravity and is highly efficient in terms of energy and material usage, but has limitations associated with the relatively large and difficult-to-control diameter of the molten metal pool that forms as the component part is built. Consequently, EBF3-made components have surface finishes and tolerances well below standard/expected values employed in engineering work. For example, components deposited by the EBF3 process typically exhibit a characteristically rough, layered surface finish. Further, wall thicknesses and surface finishes are both highly dependent on the properties of the molten metal pool. To refine EBF3 deposited components, a subtractive post machining process may be employed to remove amounts of material to bring the near-net part to the desired net shape (i.e., final size/shape). However, there is currently no means of performing subtractive machining in microgravity. Therefore, a need exists for a system, method, and apparatus for performing subtractive machining in microgravity.

SUMMARY OF THE INVENTION

This present disclosure generally relates to manufacturing, more specifically to a cyclonic system, method, and apparatus for performing subtractive machining in microgravity.

According to a first aspect, a cyclonic system for performing subtractive machining in microgravity systems comprises: an enclosure having a top plate, a base plate, and a tapered side wall joining the top plate to the base plate, wherein the enclosure defines a chamber to house a milling machine having a cutter tool; a blower to generate an airstream to be used to induce a cyclonic airflow to achieve cyclonic separation within the enclosure, wherein the cyclonic airflow is configured to urge debris from the milling machine toward the base plate; and a debris collection module to collect the debris from the milling machine.

In certain aspects, the cyclonic airflow is configured to urge the debris along the perimeter of the base plate to the debris collection module.

In certain aspects, the enclosure is a truncated-cone shape.

In certain aspects, the top plate resides in a first plane and the base plate resides in second plane that is spaced from, and substantially parallel to, the first plane.

In certain aspects, the chamber is a conical frustum defined by the tapered side wall between the top plate and the base plate.

In certain aspects, the cyclonic system may further comprise a flow splitter to receive the airstream from the blower and to divide the airstream across a plurality of air conduits.

In certain aspects, at least two air conduits are fluidly coupled to the enclosure, each at a different injection site.

In certain aspects, each of the two air conduits is configured to inject air tangentially into the enclosure to generate the cyclonic airflow.

In certain aspects, one of said plurality of air conduits is positioned within the enclosure adjacent the milling machine to supply a directed airflow at the cutter tool.

In certain aspects, the directed airflow is configured to blow debris into the cyclonic airflow via a spray nozzle.

In certain aspects, the directed airflow is configured to cool the cutter tool.

In certain aspects, the airstream is cooled by an air cooling unit outside the enclosure to yield a directed airflow having a regulated temperature.

In certain aspects, the air cooling unit is a heat exchanger.

In certain aspects, the milling machine is a computer numerical control (CNC) milling machine.

In certain aspects, the cyclonic system may further comprise a computer operatively coupled with a perception system to monitor the CNC milling machine.

In certain aspects, the computer is configured to provide feedback during operation of the milling machine.

In certain aspects, the feedback is based at least in part on a priori information and sensor data from the perception system.

In certain aspects, the tapered side wall is fabricated from metal, metal alloy, plastic, or a combination thereof.

In certain aspects, the cyclonic system may further comprise a spray nozzle to spray a directed airflow from the blower on to the cutter tool.

In certain aspects, the spray nozzle also sprays a cutting fluid on to the cutter tool.

In certain aspects, debris collection module comprises a compactor to compact the debris contained within the debris collection module.

In certain aspects, debris collection module comprises a compactor to compact the debris contained within the debris collection module.

BRIEF DESCRIPTION OF THE DRAWINGS

The foregoing and other objects, features, and advantages of the devices, systems, and methods described herein will be apparent from the following description of particular embodiments thereof, as illustrated in the accompanying figures, where like reference numbers refer to like structures. The figures are not necessarily to scale, emphasis instead is

DETAILED DESCRIPTION

Figure 1A:
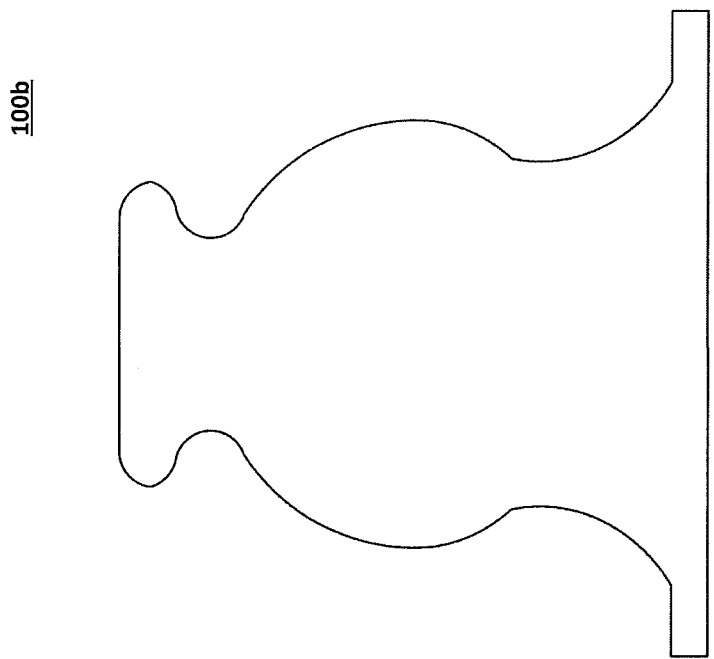
FIGS. 1a and 1b illustrate, respectively, an example 3D printed component, pre- and post-machining.

Preferred embodiments of the present disclosure will be described hereinbelow with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front," "back," and the like, are words of convenience and are not to be construed as limiting terms. For this disclosure, the following terms and definitions shall apply:

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electro-magnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "network" as used herein includes both networks and inter-networks of all kinds, including the Internet, and is not limited to any particular network or inter-network.

The term "processor" means processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with, a memory device.

Disclosed herein is a cyclonic air-cooled microgravity mill to enable production of high-precision engineering parts in a microgravity environment by adapting computer numerical control (CNC) mill technology to the microgravity environment. The cyclonic air-cooled microgravity mill uses controlled airflow and conservative toolpaths to enable the use of conventional subtractive milling machine (e.g., CNC milling machines) in microgravity environments, permitting production of high-precision parts in virtually all engineering materials beyond Earth.

Figure 1B:
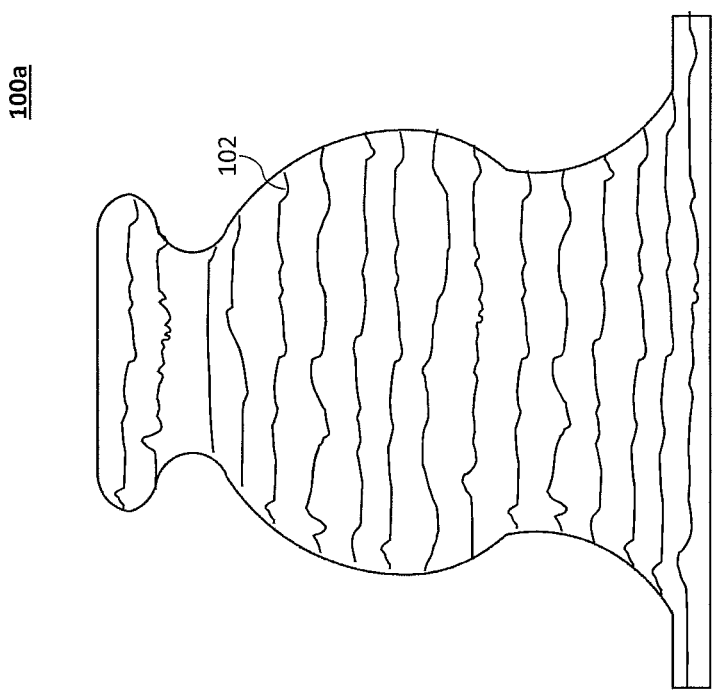

FIGS. 1a and 1b illustrate, respectively, an example 3D printed component 100 (e.g., EBF3, FDM, etc.), pre- and post-machining. As illustrated in FIG. 1a, the 3D printed component 100a, prior to machining, is near-net (slightly oversized) and exhibits surface finishes and tolerances well below standard/expected values. For example, components deposited by the EBF3 process typically exhibit a characteristically rough, layered surface finish 102. Because the 3D printed component 100a is slightly oversized, the surface can be milled down to remove the rough, layered surface finish 102. Specially, a subtractive post machining process may be employed to remove small amounts of material (e.g., about ⅛ inch) to bring the near-net 3D printed component 100a to the desired net shape of the 3D printed component 100b illustrate in FIG. 1b. Note that the surface of the milled 3D printed component 100b is substantially smoother and defect free, compared to the original 3D printed component 100a.

Figure 2A:
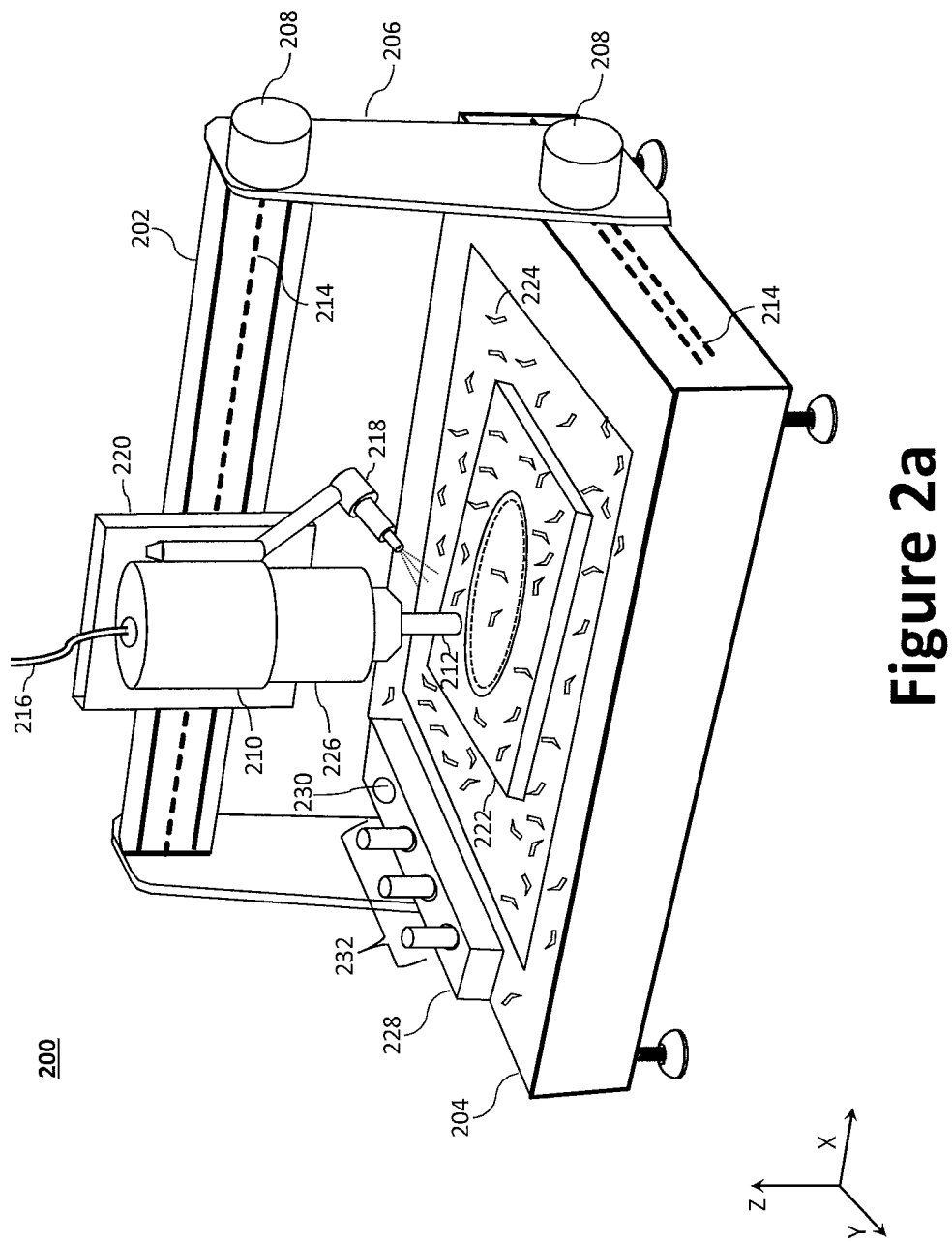
FIGS. 2a through 2c illustrate an example subtractive milling machine.

FIG. 2a illustrates an example subtractive milling machine 200 to fixture a workpiece 222 (e.g., the 3D printed component 100) and to perform the cutting/milling. The subtractive milling machine 200 may generally comprise a drive motor 210 to rotate a tool bit (e.g., a cutter tool 212) via a spindle 226, a spray nozzle 218 to spray, for example, a cutting fluid 228 on the cutter tool 212, and a multi-axis frame to support and move the cutter tool 212 relative to a workpiece 222 (e.g., a 3D printed component 100). The multi-axis frame's axis motors 208 and the drive motor 210 may be controlled using signals from a computer communicatively coupled to the subtractive milling machine 200 via a data and power cable 216. Depending on the need, the subtractive milling machine 200 may be a small CNC milling machine with a desktop form factor and may provide movement along two to six axes. For example, the subtractive milling machine 200 may be any size between 1 to 10 feet on a side (i.e., the X-, Y-, and Z-axis), depending on the intended application. A subtractive milling machine 200 with a desktop form factor (i.e., 3 feet or less on a side) may be, for example, 10 to 25 inches tall (Z-axis), 15 to 36 inches wide (X-axis), and 15 to 36 inches deep (Y-axis).

The multi-axis frame may selectively move the cutter tool 212 relative to the workpiece 222 (which is positioned on a work surface of the base structure 204) along one or more of the X-, Y-, and Z-axes (i.e., three actuated degrees of freedom) under computer (i.e., processor) control. In other implementations, the subtractive milling machine 200 may incorporate additional actuated degrees of freedom in additional to the X-, Y-, and Z-axes, up to six actuated degrees of freedom.

The multi-axis frame may employ a plurality of axis motors 208 (e.g., stepper motors) and linear couplings 214 (e.g., linear rails, tracks, rods, etc.) to move the cutter tool 212 along each actuated degree of freedom within its operating envelop. For example, one or more axis motors 208 and linear couplings 214 may be provided to selectively control each axis of freedom. The axis motor(s) 208 may provide a resolution of 0.001 inch or greater on each axis to achieve a dimensional accuracy better than ±0.005 inch.

In one example, the multi-axis frame may include a linear cross-member 202 coupled to a base structure 204 via a set of parallel vertical support members 206. As illustrated, the linear cross-member 202 is coupled at each end to a vertical support member 206 at a right angle (90° degrees) such that the longitudinal axis of the linear cross-member 202 is substantially parallel to the working surface (i.e., the top plane/surface) of the base structure 204. The drive motor 210 may be coupled to a motor mount 220 such that the drive motor can move relative to the base structure 204 along the Z-axis (i.e., up and down). For example, the drive motor 210 (or an intermediate motor structure coupled to the drive motor 210) may be slideably coupled to the motor mount 220 via a first set of linear couplings and controlled via a first axis motor. In another example, the drive motor 210 may be fixed relative to the motor mount 220, where movement along the Z-axis is achieved by displacing the spindle 226 relative to the motor mount 220 or displacing the cutter tool 212 relative to the spindle 226 via a quill (e.g., an extendable part of the spindle 226).

The motor mount 220, in turn, may be coupled to the linear cross-member 202 and configured to travel relative to the base structure 204 along the X-axis via a second set of linear couplings 214 under the power of a second axis motor 208. To provide movement along the Y-axis, each vertical support member 206 may be slideably coupled to the base structure 204 via a third set of linear couplings 214 such that it moves relative to the base structure 204 under the power of a third axis motor, which may be positioned on the vertical support members 206 (as illustrated) or within the base structure 204. As can be appreciated, displacing the set of vertical support members 206 along the Y-axis also displaces the linear cross-member 202 and devices coupled thereto.

The cutter tool 212 may be coupled to the drive motor 210 via the spindle 226. The cutter tool 212 may be removably coupled to the spindle 226 using, for example, a chuck key. The spindle 226 may be configured to couple with various cutter tools 212 of different sizes. For example, the spindle 226 may accept cutter tool 212 bits with a ⅛ inch shank, but can be adjusted to accommodate shanks of other sizes (e.g., 3/16 inch, ¼ inch, ½ inch, etc.) using, inter alia, an adjustable spindle and/or an adapter. The spindle 226 can also accept a variety of other tool bits, including but not limited to inspection probes and additive manufacturing heads. For example, a metal additive laser cladding manufacturing head may be used, or a touch inspection probe, which can be used for contact-based inspection techniques.

The subtractive milling machine 200 may further include a tool stand 228 within the subtractive milling machine's 200 operating envelop (e.g., on the base structure 204) to store additional cutting, inspection, and other miscellaneous tools 232, which may be loaded into the spindle 228. Specifically, the tool stand 228 may employ a plurality of tool receptacles 230 to secure additional tools 232 when not in use. In operation, when a different tool is desired, the subtractive milling machine 200 may navigate the tool currently in use (e.g., cutter tool 212) to an unoccupied tool receptacle 230, inserted the tool into the unoccupied tool receptacle 230, and release the shank of the tool from the spindle 226. The spindle 226 may then navigate under processor control to a different tool within the tool stand 228, whereby the spindle 226 may engage the desire tool and lock the tool in place (e.g., by tighten the spindle 226 around the new tool's shank). Once the desired tool is locked in place, the subtractive milling machine 200 may resume its operation.

The structure of the multi-axis frame may be fabricated using a light weight, high strength, and rigid component, which may be fabricated using metal extrusion techniques. Suitable metals include, for example, aluminum, brass, copper, lead (and tin), magnesium, zinc, steel, titanium, iron, and alloys thereof. Magnesium, whose material characteristics (e.g., melting point) make it about as extrudable as aluminum, is particular well suited for aircraft parts and nuclear industry parts.

Figure 2B:
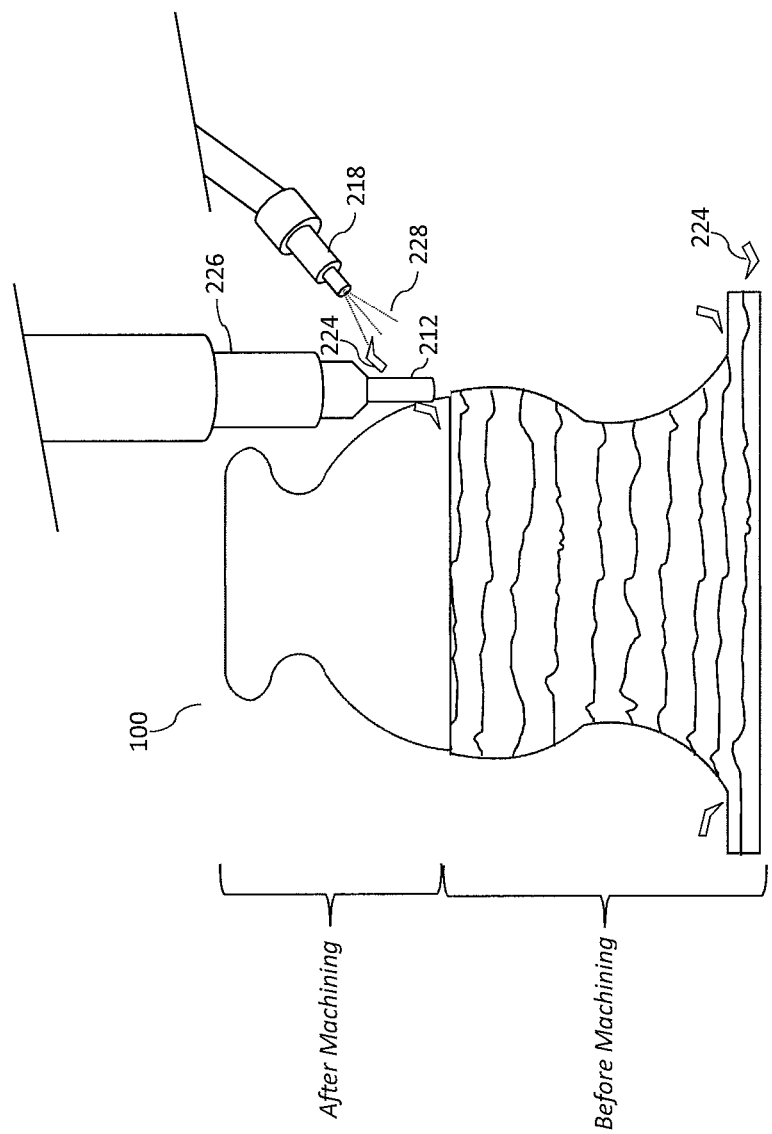

With reference to FIG. 2b, in operation, the drive motor 210 rotates the spindle 226 and the cutter tool 212 at a high speed, where the cutter tool 212 is moved within its operating envelop by the multi-axis frame (under computer control) to selectively cut away material from the 3D printed component 100. The speed of the spindle 226 (i.e., revolutions per minute (RPM)) may be determined as a function of the material and the diameter of the cutter tool 212. By selectively controlling the axis motor for each axis of freedom, the cutter tool 212 can be positioned within any point within its 3D operational envelope, which is dictated by the lateral movement afforded in each axis of freedom. As illustrated, debris (e.g., scrap chips) is produced as the cutter tool 212 removes portions of the workpiece 222.

As the cutter tool 212 engages the 3D printed component 100, in addition to debris 224, heat and/or sparks can be created. Therefore, a spray nozzle 218 may be provided adjacent the workpiece 222 to spray, inter alia, a cutting fluid 228 on the contact point between the cutter tool 212 and the 3D printed component 100. While the 3D printed component 100 may be "cut dry" to improve cleanliness (i.e., operate without a cutting fluid 228 or other liquid lubricant), cutting fluid 228 offers a number of benefits. Cutting fluid is primarily used to cool the cutter, which heats up as it cuts chips from the base part due to friction. For example, cutting fluid 228 increases the maximum permissible cutting speed by lubricating and cooling the cutter tool 212, thereby reducing overall costs and improving tolerances, tool life, and overall speed. Cutting fluids, however, are time-consuming to clean up and potentially toxic.

Figure 2C:
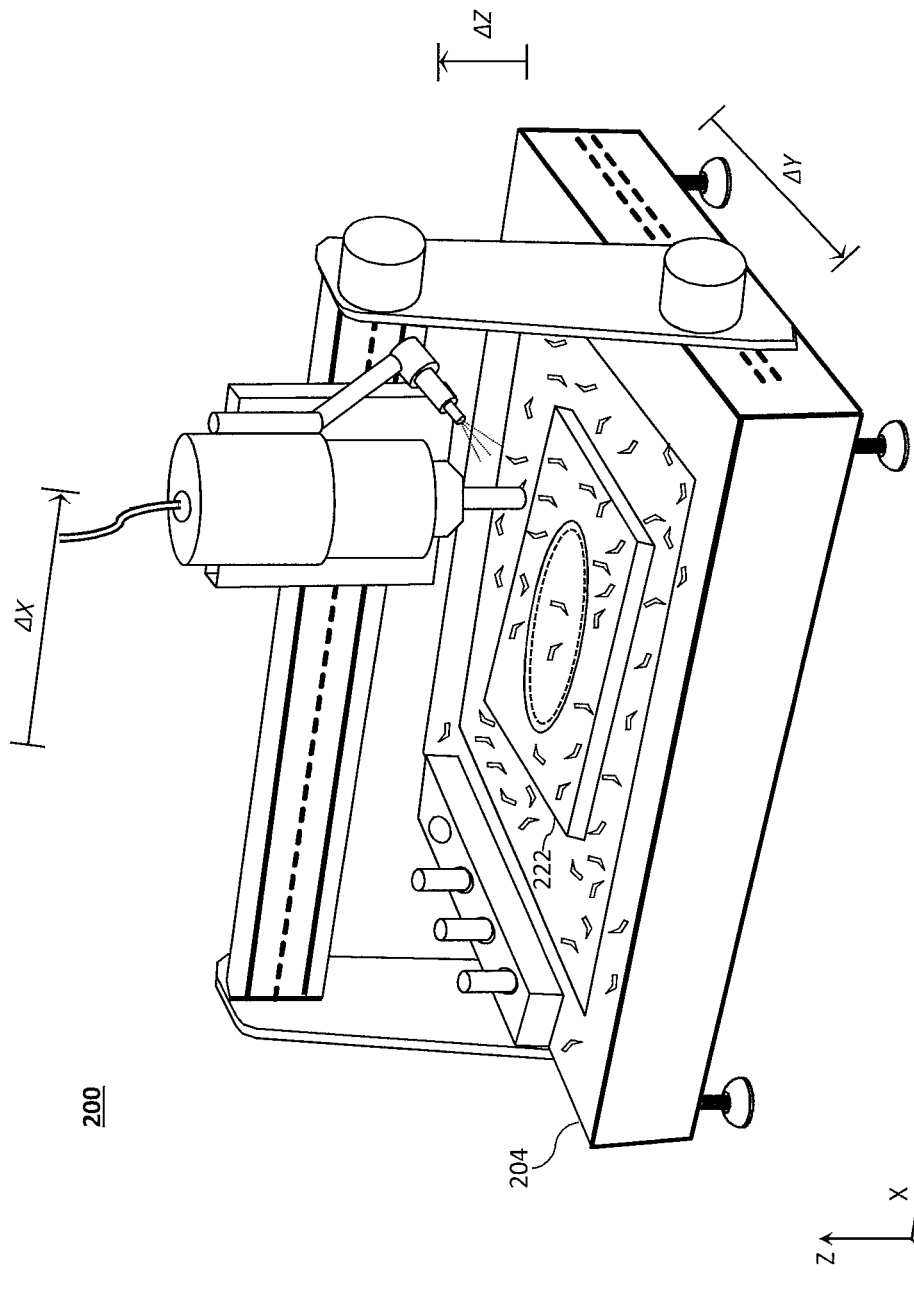

As illustrated, the cutter tool 212 is guided along and/or around the surface of the 3D printed component 100 to remove its outermost layer, thereby removing the rough, layered surface finish 102 to create a smooth finish. For example, compare FIG. 2a with FIG. 2c, which demonstrates movement of the cutter tool 212 along each of the X-, Y-, and Z-axes. Specifically, FIG. 2c illustrates, relative to FIG. 2a, that the cutter tool 212 as displaced to the right (along the X-axis) by $\Delta X$, forward (along the Y-axis) by $\Delta Y$, and upward (along the Z-axis) by $\Delta Z$.

As can be appreciated, the process of removing the outermost layer reduces the size of the 3D printed component 100, which is a reason the 3D printed component 100a, as printed, is slightly larger than the size of the target milled 3D printed component 100b. In certain aspects, the spindle 226 may be configured to perform both an additive manufacturing process (e.g., electron-beam welding, laser cladding, or FDM, etc.) and a subtractive manufacturing process (e.g., CNC milling).

There are two major obstacles to overcome when using a subtractive milling machine 200 in microgravity. A first obstacle is management of the debris 224 that is produced as the cutter tool 212 removes materials from the workpiece 222. A second obstacle is management of the cutting fluid 228 that cools and lubricates the cutter tool 212. The first obstacle is addressed by means of an enclosure 302 that uses cyclonic separation to collect and evacuate debris 224 from the enclosure 302. The second obstacle can be addressed in two ways: by (a) substituting conventional cutting fluids 228 with a directed airflow (e.g., jet) of cooled or ambient air that keeps the cutter tool 212 cool and/or (b) by utilizing highly conservative toolpaths that maximize cutter tool 212 life and part precision at the expense of overall speed, which is less critical in spaceflight applications.

Figure 3A:
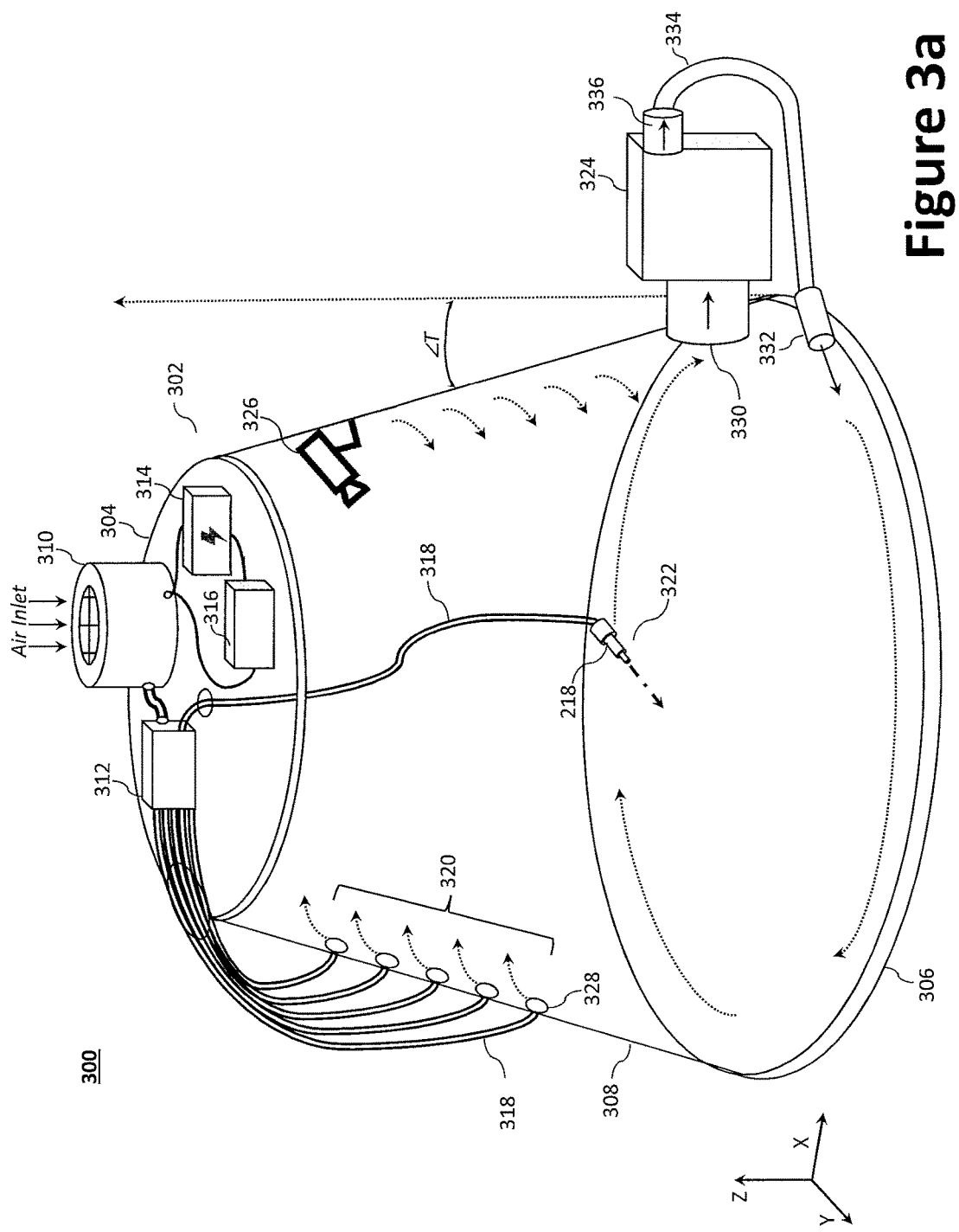
FIGS. 3a and 3b illustrate an example cyclonic air-cooled enclosure for use with a subtractive milling machine in a microgravity environment.
Figure 3B:
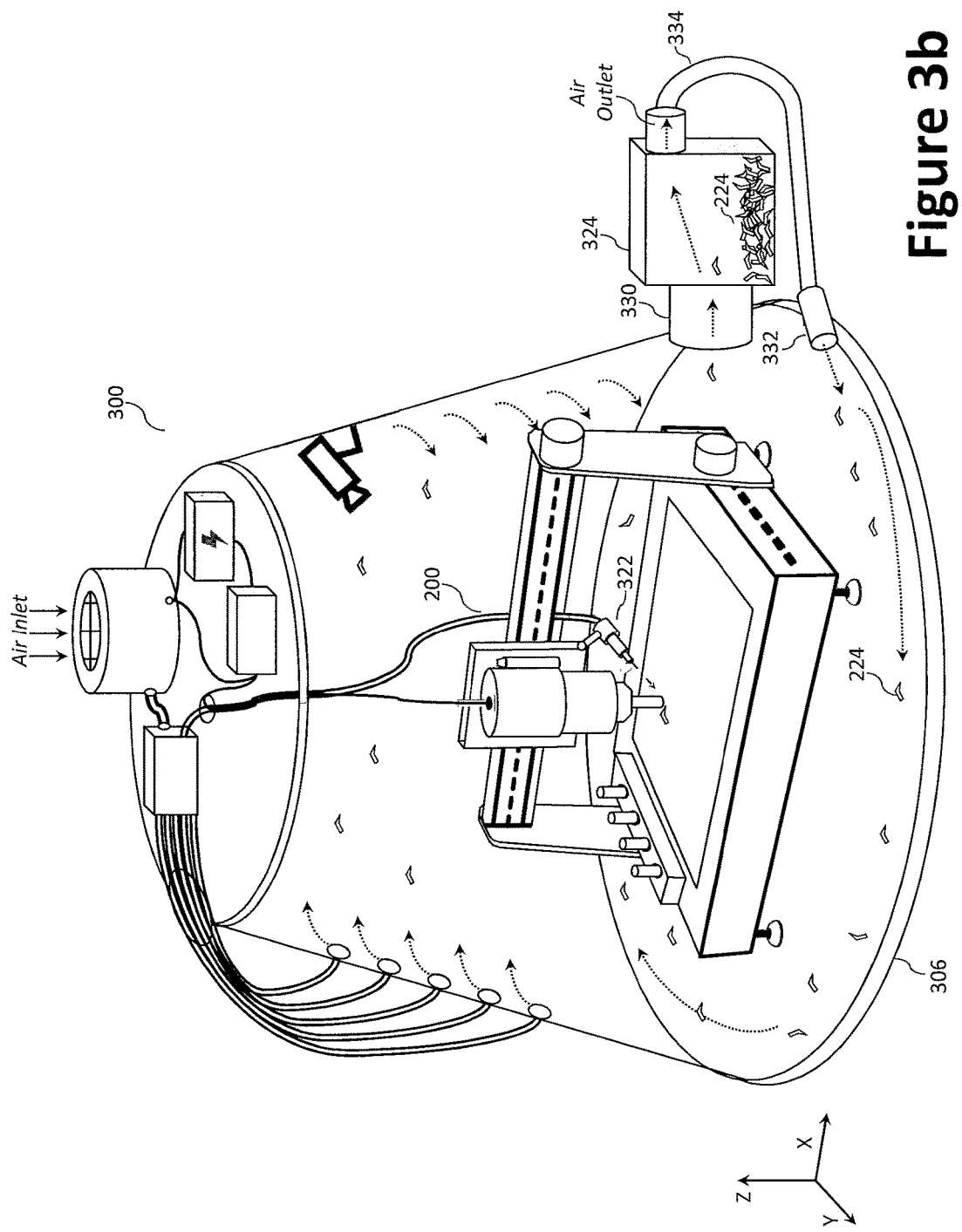

FIGS. 3a and 3b illustrate an example cyclonic air-cooled enclosure 300 for use with a subtractive milling machine 200 in a microgravity environment. More specifically, FIG. 3a illustrate an empty cyclonic air-cooled enclosure 300, while FIG. 3b illustrates a cyclonic air-cooled enclosure 300 containing a subtractive milling machine 200 milling a 3D printed component 100. The cyclonic air-cooled enclosure 300 generally comprises an enclosure 302, a blower 310, a flow splitter 312, a power supply 314, a computer 316 (e.g., a processor), a plurality of air conduits 318, and a debris collection module 324.

The cyclonic air-cooled enclosure 300 offers a number of advantages in microgravity environments. The cyclonic air-cooled enclosure 300 obviates the need for cutting fluid by achieving cooling with a stream of ambient or cooled airflow, combined with conservative toolpaths that reduce loading on cutting tool at the expense of increased manufacturing time. For example, the tapered cyclonic separator is designed to provide a cyclonic separation in microgravity environments to actively remove debris 224 from a subtractive milling machine 200 as the debris 224 is generated. To that end, one or more blowers 310 may be configured to generate an airstream that is used to induce the cyclonic airflow used to achieve cyclonic separation within the enclosure. For example, blower 310 may be used to provide multiple circumferential airstreams (e.g., a primary blower system 320) to generate the cyclonic airflow and/or a single airstream positioned in the cyclonic separator to supply a directed airflow at the cutter tool (e.g., a secondary blower system 322). Further, cyclonic separators, unlike conventional filters, do not lose suction as debris 224 is collected. Finally, a perception system 326 coupled to the computer 316 may be provided to combine a priori information and sensor data to provide real-time feedback and quality control during subtractive machining.

The enclosure 302 seals the subtractive milling machine 200 and provides the surfaces (e.g., walls) for performing cyclonic separation. For example, the enclosure 302 may be defined by a top plate 304 and a base plate 306, which are connected to one another via a tapered side wall 308 to mimic the effect of gravity. Each of the top plate 304 and the base plate 306 may be generally planar, circular, and, as illustrated, of different diameters. As illustrated, the top plate 304 resides in a first plane, while the base plate 306 resides in second plane that is vertically (Z-axis) spaced from, and substantially parallel to, the first plane. Specifically, the diameter of the top plate 304 may be less than that of the base plate 306 to, in effect, provide the taper to tapered side wall 308. Therefore, the top plate 304 and the base plate 306, together with the tapered side wall 308, define a flat top cone (i.e., truncated-cone shape, or a conical frustum). In other words, the conical frustum defined by the tapered side wall between the top plate and the base plate defines the chamber of the enclosure 302 that houses the subtractive milling machine 200. For example, when the subtractive milling machine 200 employs a desktop form factor, the base plate 306 may be between about 2 and 3 feet, where the taper angle ($\angle T$) of the tapered side wall 308 may be between about 10° and 30° inward (relative to a vertical z-axis), as best illustrated in FIG. 3a. The diameter of the base plate 306 is dictated by the size (e.g., footprint) of the subtractive milling machine 200, while the diameter of the top plate 304 is a trigonometric function of the diameter of the base plate 306, the taper angle of the tapered side wall 308, and the vertical distance between the top plate 304 and the base plate 306. As can be appreciated, the taper angle of the tapered side wall 308 may be selected as a function of the speed of the circumferential airflow and the force of friction between the debris 224 and the tapered side wall 308.

The enclosure 302 may be fabricated using or more lightweight materials, such as metals/metal alloys (e.g., aluminum, brass, copper, lead (and tin), magnesium, zinc, steel, titanium, iron, and alloys thereof), plastic (e.g., acrylic, acrylite, acrylonitrile butadiene styrene (ABS), polycarbonate, polyethylene, polyethylene high-density (PEHD), polypropylene, polyvinyl chloride (PVC), styrene, thermoplastic polymer, vinyl, etc.), fiberglass, glass (e.g., laminated glass), etc. The enclosure's 302 components may be fabricated from a single material, or different materials. For example, the top plate 304 and the base plate 306 may be fabricated from a rigid non-transparent material, while the tapered side wall 308 may be fabricated from a semi-flexible, transparent material. While the tapered side wall 308 is illustrated as fabricated from a single, continuous material, the tapered side wall 308 may instead be fabricated using multiple panels of like, or different, materials. For example, one or more panels may be transparent to permit the user to monitor the subtractive milling machine 200, while the remaining one or more panels may be non-transparent.

The conical enclosure 302 may be built around the subtractive milling machine 200. In certain aspect, the top plate 304 or the base plate 306 may be removably coupled with the tapered side wall 308 to enable the operator to access and/or remove the subtractive milling machine 200 and/or the 3D printed component 100. For example, the base plate 306 may couple to the tapered side wall 308 using a twist and lock mechanism or, in the alternative, one or more latches to couple the tapered side wall 308 to the base plate 306. In certain aspects, the tapered side wall 308 may include a door or hatch that may be opened/removed to access and/or remove the subtractive milling machine 200 and/or the 3D printed component 100.

The blower 310, flow splitter 312, power supply 314, and computer 316 may be positioned on top of the enclosure 302 (e.g., on the top plate 304). Alternatively, one or more of the blower 310, flow splitter 312, power supply 314, and computer 316 may be positioned elsewhere (e.g., adjacent the enclosure 302 or remotely).

The power supply 314 may be self-powered (e.g., using a battery, solar panel, etc.), or coupled to the vehicle's electrical system (e.g., the space shuttle/space station's electrical system, which operates at 120 to 160 volts DC). The power supply 314 may employ one or more voltage converters/inverters to convert an input voltage (whether a battery or vehicle's electrical system) to desired voltage and current needed to operate the various components (e.g., the blower 310, computer 316, perception system 326, etc.). For example, the power supply 314 may include one or more DC/DC converters, such as step-down, buck-boost, boost, buck, or flyback converters.

The computer 316 may control the various operations of the cyclonic air-cooled enclosure 300 and/or, in certain circumstances, the subtractive milling machine 200. The computer 316 may employ, for example, a processor, a graphics processing unit (GPU) and/or field-programmable gate array (FPGA). The computer 316 may be mounted outside the enclosure 302 with accessible input and output ports. The computer 316 may employ a form factor approximately equivalent to that of a Raspberry Pi™ computer. For example, the computer 316 may read sensors (e.g., temperature, airflow, etc.) positioned in (or adjacent) the enclosure 302, control the blower(s) 310, interface with the perception system 326, read input tool paths, and send commands to subtractive milling machine 200. For example, the computer 316 may command the subtractive milling machine 200 to use highly-conservative toolpaths to optimize part quality and tool life.

A toolpath refers to the coordinates (or path) in a three dimensional space (e.g., the operating envelop) that the cutter tool 212 travels to perform the desired machining operations. Toolpaths are calculated and reviewed by the operator before the subtractive milling machine 200 begins machining. A conservative toolpath refers to a toolpath that travels over the workpiece 222 slowly while taking a shallow cut, whereas a conventional toolpath travels over the workpiece 222 quickly while taking a deep cut. The life of the cutter tool 212 may be extended by reducing the loading on the cutter tool 212 by adopting conservative toolpaths, which are less damaging to the cutter tool 212.

The blower 310 (or system of blowers) may be used to supply the enclosure 302 with an inert gas to induce the cyclonic airflow (indicated in the drawing using dotted arrows) necessary for cyclonic separation and a directed airflow (indicated in the drawing using dot-dash arrows). The inert gas may include, inter alia, atmospheric air (i.e., a mixture of 78.09% nitrogen, 20.95% oxygen, 0.93% argon, 0.04% carbon dioxide, and small amounts of other gases), purified argon, purified nitrogen, etc. The blower 310 receives inert gas at its air inlet from an air supply (or the area around the enclosure 302) to generate a high pressure air airstream. The airstream is conveyed to the flow splitter 312, which divides the airstream across a plurality of air conduits 318. A plurality of the air conduits 318 injects air tangentially (e.g., as illustrated, relative to the tapered side wall 308) into the enclosure 302 via a different injection site 328 (e.g., hole/inlet) in the tapered side wall 308 to generate a cyclonic airflow within the enclosure 302, which defines a primary blower system 320. For example, FIG. 3a illustrates a primary blower system 320 having five injection sites, each injection site begin coupled to an air conduit 318 from the flow splitter 312. The airflow from the air conduits 318 at the injection sites work in concert to generate the cyclonic airflow to achieve cyclonic separation within the enclosure.

To regulate the temperature within the enclosure 302, an air cooling unit (e.g., a heat exchanger, refrigeration cycle, vortex tube, etc.) may be used to cool the inert gas (e.g., ambient air) to a regulated temperature (e.g., a predetermined temperature) before entering the enclosure 302. The air cooling unit (not illustrated) may be fluidly coupled in line between the blower 310 and the flow splitter 312, or downstream of the flow splitter 312 if temperature regulation is only desired for certain air conduits 318. While the air cooling unit is particularly useful in the secondary blower systems 322 (where it is desirable to cool the cutter tool 212), the air cooling unit may be used to cool the inert air supplied by either or both of the primary or secondary blower systems 320, 322. In lieu of the primary blower system 320, the cyclonic air-cooled enclosure 300 may instead employ a centrifuge where the entire enclosure 302 is configured to rotate about an axis that is perpendicular to the base plate 306, thereby inducing the cyclonic airflow to force the debris 224 to the perimeter. The axis that is perpendicular to the base plate 306 may be positioned at the center of the circled defined by the base plate 306.

The debris 224 (e.g., loose chips, such as metal shavings) within the enclosure 302 are accelerated by the cyclonic airflow, resulting in a centrifugal force that pushes debris 224 to the outer perimeter of the enclosure 302. When the debris 224 reaches the outer perimeter of the enclosure 302, the centrifugal force continues to push them radially outward, which causes the debris 224 to also slide down the low-friction inner surface of the tapered side wall 308 of the enclosure 302 and toward the base plate 306. The debris 224 collects and rotates along the perimeter of the base plate 306 (as best illustrated in FIG. 3*b*) prior to exiting the enclosure 302 via a waste port 330. The waste port 330 is fluidly coupled to a user-serviceable debris collection module 324, where the debris 224 is collected for storage and, ultimately, disposal.

The debris collection module 324 may be coupled with the enclosure 302 via, for example, a threaded coupling, quick release connector, twist and lock mechanism, etc. In certain aspects, the debris collection module 324 may include a compactor or shredder to enable a debris collection module 324 of a given size to store additional debris 224 by compacting/reducing the size of the debris 224 contained within the debris collection module 324, thereby increasing the time between emptying the debris collection module 324. In certain aspects, the debris collection module 324 may fuse the debris 224 into a single unit (e.g., a block) for recycling, which may be used with other scrap material, stock, and old parts or components to create new stock.

The inert gas used to generate the cyclonic airflow may exit the enclosure 302 via an air outlet 336 positioned at the downstream end of the debris collection module 324 where it recirculates back into the enclosure 302 via a return tube 334 and return port 332, ensuring that no leakage into the surrounding environment occurs (i.e., an airtight closed system). As illustrated, the air outlet 336 may be positioned at the upper end of the downstream end of the debris collection module 324 to mitigate the risk of debris 224 passing through the air outlet 336. The air outlet 336 may employ one or more filters to ensure that the smaller debris 224 remains in the debris collection module 324. In certain aspects, the pressure within the debris collection module 324 may be monitored (e.g., via computer 316) to detect blockage between the air outlet 336 and the return port 332. As illustrated, the return port 332 may be positioned at an angle (tangentially) relative to the tapered side wall 308 such that return air from the debris collection module 324 is substantially aligned with the cyclonic airflow, thereby maintaining a steady cyclonic airflow with minimal turbulence caused by introduction of the return air to the enclosure 302.

An air conduct 318 from the flow splitter 312 may be positioned within the enclosure 302 and coupled to a spray nozzle 218 adjacent the cutter tool 212, which defines a secondary blower system 322 to supply a directed airflow at the cutter tool 212 to blow debris 224 from the cutter tool 212 and into the cyclonic airflow generated by the primary blower system 320. In addition to blowing debris 224 away from the cutter tool 212 into the cyclonic airflow, the directed airflow from the spray nozzle 218 of the secondary blower system 322 can serve a function similar to that of the cutter fluid 228 (e.g., cooling the cutter tool 212), but without the mess associated with the cutter fluid 228. The spray nozzle 218 may be coupled to the 220 that it travels with the cutter tool 212 during operation. Therefore, the secondary blower system 322 may supplement the effectiveness of the cutter fluid 228, or the cutter fluid 228 may be omitted entirely in favor of directed airflow from the secondary blower system 322 (e.g., where a cooling unit is used). For example, while the cyclonic air-cooled enclosure 300 obviates the need for cooling fluid via the secondary blower system 322, the spray nozzle 218 may nevertheless be used to deliver a nominal amount of cutting fluid 228 with the directed airflow during the machining process.

The cyclonic air-cooled enclosure 300 may further comprise a perception system 326 to monitor the milling process and/or progress of the milling operation, which may be used by the computer 316 to adjust parameters for the cutting process. The perception system 326 including, inter alia, lasers, infrared cameras, lighting, profilometers to measure surface's profile, ultrasound, and/or cameras to monitor the work part's 3D geometry, temperature profile, internal structural information, and the size of the debris 224 being produced. Coupled with a priori information stored to a database of a memory device, such as 3D point data, CAD files, other analysis information (e.g., thermal, structural, dynamic, etc.), and finite element method (FEM) information, the perception system 326 enables in-process (e.g., real-time, or near real-time) feedback to the subtractive milling machine's 200 controller/computer (e.g., computer 316), improving overall safety and quality control. For example, the perception system 326 may be configured to dynamically reduce the depth of cut if the debris 224 is perceived to be too large, or abort the process entirely if an unexpected error is detected or predicted.

The cyclonic air-cooled enclosure 300 extends the capability of existing 3D printers that can print plastic and metal with very little waste, but suffer from poor surface finishes and dimensional accuracy. The cyclonic air-cooled enclosure 300 facilitates the crucial finishing pass to achieve a high-quality surface finish and dimensional accuracy that is required by most aerospace and spaceflight hardware. This cooperative relationship between low-waste additive manufacturing and high-precision subtractive manufacturing renders in-space manufacturing viable and useful.

While the cyclonic air-cooled enclosure 300 has been described primary with regard to microgravity environments, the principles of the cyclonic air-cooled enclosure 300 may also be employed in environments with ordinary gravitational forces, such as on Earth. For example, the cyclonic air-cooled enclosure 300 may be employed in situations where the cleanup of debris 224 and cutting fluid 228 typically associated with conventional subtractive milling machine is unacceptable or undesirable. Examples include, without limitation, precision manufacturing in a clean room where air quality is closely monitored. In this case, a conventional gravitational cyclonic separator design could be used, obviating the need for a taper on the enclosure around the subtractive milling machine. That is, because of the gravitational forces on Earth, the top plate 304 and the base plate 306 may be of like diameter such that the side wall is cylindrical rather than conical in shape.

The above-cited patents and patent publications are hereby incorporated by reference in their entirety. Where a definition or the usage of a term in a reference that is incorporated by reference herein is inconsistent or contrary to the definition or understanding of that term as provided herein, the meaning of the term provided herein governs and the definition of that term in the reference does not necessarily apply. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the teachings of the subject disclosure may therefore be practiced otherwise than as specifically described above.

What is claimed is:

1. A cyclonic system for performing subtractive machining in microgravity systems, the cyclonic system comprising:
   an enclosure having a top plate, a base plate, and a tapered side wall joining the top plate to the base plate, wherein the enclosure defines a chamber to house a milling machine having a cutter tool;
   a blower to generate an airstream to be used to induce a cyclonic airflow to achieve cyclonic separation within the enclosure, wherein the cyclonic airflow is configured to urge debris from the milling machine toward the base plate; a flow splitter to receive the airstream from the blower and to divide the airstream across a plurality of air conduits, wherein at least two air conduits of the plurality of air conduits are fluidly coupled with the enclosure, each of the at least two air conduits being positioned at a different injection site and configured to inject air tangentially into the enclosure to generate at least a portion of the cyclonic airflow; and
   a debris collection module to collect the debris from the milling machine.

2. The cyclonic system of claim 1, wherein the cyclonic airflow is configured to urge the debris along the perimeter of the base plate to the debris collection module.

3. The cyclonic system of claim 1, wherein the enclosure is a truncated-cone shape.

4. The cyclonic system of claim 1, wherein the top plate resides in a first plane and the base plate resides in second plane that is spaced from, and substantially parallel to, the first plane.

5. The cyclonic system of claim 4, wherein the chamber is a conical frustum defined by the tapered side wall between the top plate and the base plate.

6. The cyclonic system of claim 1, wherein one of said plurality of air conduits is positioned within the enclosure adjacent the milling machine to supply a directed airflow at the cutter tool.

7. The cyclonic system of claim 6, wherein the directed airflow is configured to blow debris into the cyclonic airflow via a spray nozzle.

8. The cyclonic system of claim 6, wherein the directed airflow is configured to cool the cutter tool.

9. The cyclonic system of claim 8, wherein the airstream is cooled by an air cooling unit outside the enclosure to yield a directed airflow having a regulated temperature.

10. The cyclonic system of claim 8, wherein the air cooling unit is a heat exchanger.

11. The cyclonic system of claim 1, wherein the milling machine is a computer numerical control (CNC) milling machine.

12. The cyclonic system of claim 11, further comprising a computer operatively coupled with a perception system to monitor the CNC milling machine.

13. The cyclonic system of claim 12, wherein the computer is configured to provide feedback during operation of the milling machine.

14. The cyclonic system of claim 13, wherein the feedback is based at least in part on a priori information and sensor data from the perception system.

15. The cyclonic system of claim 1, wherein the tapered side wall is fabricated from metal, metal alloy, plastic, or a combination thereof.

16. The cyclonic system of claim 1, further comprising a spray nozzle to spray a directed airflow from the blower on to the cutter tool.

17. The cyclonic system of claim 16, wherein the spray nozzle also sprays a cutting fluid on to the cutter tool.

18. The cyclonic system of claim 1, wherein the debris collection module comprises a compactor to compact the debris contained within the debris collection module.

19. The cyclonic system of claim 1, wherein the debris collection module comprises an air outlet and a return tube configured to return air expelled from the air outlet into the enclosure.

20. The cyclonic system of claim 19, wherein the return tube is configured to inject the air from the air outlet into the enclosure tangentially.

21. The cyclonic system of claim 1, further comprising a computer operatively coupled with an airflow sensor, wherein the airflow sensor is configured to monitor airflow within the debris collection module or the enclosure.

* * * * *